United States Patent
Diener et al.

(10) Patent No.: US 6,517,799 B2
(45) Date of Patent: Feb. 11, 2003

(54) ISOLATION OF SMALL-BANDGAP FULLERENES AND ENDOHEDRAL METALLOFULLERENES

(75) Inventors: Michael D. Diener, Denver, CO (US); John Michael Alford, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 09/794,271

(22) Filed: Feb. 27, 2001

(65) Prior Publication Data

US 2002/0025291 A1 Feb. 28, 2002

Related U.S. Application Data

(62) Division of application No. 09/291,895, filed on Apr. 14, 1999, now Pat. No. 6,303,016.
(60) Provisional application No. 60/081,723, filed on Apr. 14, 1998.

(51) Int. Cl.$^7$ ................................................. C01B 31/02
(52) U.S. Cl. ....................................................... 423/445 B
(58) Field of Search ...................................... 423/445 B

(56) References Cited

U.S. PATENT DOCUMENTS 5,493,094 A * 2/1996 Simmons ................ 423/445 R

* cited by examiner

*Primary Examiner*—Arun S. Phasge
(74) *Attorney, Agent, or Firm*—Conley, Rose & Tayon, P.C.

(57) ABSTRACT

A method for recovering small bandgap fullerenes, including metallofullerenes, from soot by passivating individual fullerenes and/or metallofullerenes to an anionic configuration. The addition of extra electrons to a metallofullerene or small bandgap fullerene breaks the interfullerene bonding in the solid material, and the resulting anions are soluble in organic electrochemical solvents. Once dissolved, the small bandgap fullerenes can be plated out or precipitated by returning them to a neutral state.

24 Claims, 6 Drawing Sheets

ISOLATION OF SMALL-BANDGAP FULLERENES AND ENDOHEDRAL METALLOFULLERENES

CROSS-REFERENCE TO RELATED APPLICATIONS

This is a divisional application of U.S. patent application Ser. No. 09/291,895 filed Apr. 14, 1999 now U.S. Pat. No. 6,303,016.

The present application claims the benefit of U.S. provisional application Ser. No. 60/081,723, filed Apr. 14, 1998 and entitled Isolation of Small-Bandgap Fullerenes and Endohedral Metallofullerenes, which is incorporated herein by reference in its entirety.

STATEMENT REGARDING FEDERALLY SPONSORED RESEARCH OR DEVELOPMENT

This work was funded by the National Science Foundation, Contract Number DMI-9561553.

TECHNICAL FIELD OF THE INVENTION

The present invention relates generally to fullerenes and more particularly to fullerenes having a small bandgap. Still more particularly, the present invention relates to small bandgap fullerenes and both small bandgap and radical (zero bandgap) endohedral metallofullerenes, and a method and system for isolating and recovering these molecules.

BACKGROUND OF THE INVENTION

Fullerenes are the class of carbon compounds distinguished by their multi-faceted, closed molecular structure. The nature of the electron "shells," or orbitals, that surround the nucleus of every atom dictates that each orbital is "filled" when it contains a certain number of electrons. Atoms bond to form molecules because by bonding they can share electrons and fill shells that would otherwise be only partially filled. An unbonded carbon atom has four electrons in its outermost shell, but would prefer to have eight. For this reason, carbon atoms bond readily with other atoms, including other carbon atoms.

Under certain conditions, carbon atoms bond together such that the carbon-carbon bonds form a framework of hexagons and pentagons that resembles the familiar hexagon/pentagon surface of a soccer ball. Molecules having this structure have come to be known as fullerenes. The number and positioning of the hexagons and pentagons can vary, within both constraints that exactly 12 pentagons and that an even number of carbon atoms be present It happens that the spherical molecule formed by sixty carbon atoms (C60) comprises a parficularly stable combination of hexagons and pentagons and is the most widely studied fullerene to date. In general, more than one arrangement of the hexagons and pentagons is possible, leading to a great variety of possible isomers for any particular number of carbon atoms in a fullerene. To help specify a particular fullerene isomer, the symmetry group name to which that isomer belongs is affixed to the molecular formula, but even this is imperfect as it is common for many isomers belonging to the same point group to be present for any particular number of carbon atoms.

The currently known methods for making fullerenes involve evaporating carbon atoms and cooling them slowly, so that some of them assemble into fullerene molecules. Even under optimal conditions, however, not all of the evaporated carbon atoms end up in fullerene molecules (the remainder forms soot). While $C_{60}$–$I_h$ forms a significant fraction of the total fullerene production, the fullerene molecules that are produced can have more than three hundred carbon atoms. Under current practices, the fullerenes are extracted from the soot using a non-polar solvent, such as toluene. $C_{60}$–$I_h$ dissolves readily in such solvents, as do several other fullerenes with isolated pentagons, including but not limited to, $C_{70}$-$D_{5h}$, $C_{76}$-$D_2$, $C_{78}$-$C_{2v}'$, $C_{78}$-$C_{2v}''$, $C_{78}$-$D_3$, $C_{80}$-$D_2$, $C_{84}$-$D_{2d}$ and $C_{84}$-$D_2$. Once dissolved, the fullerenes can be recovered in a relatively pure form. Additionally, there are many empty fullerene structures that are predicted to be stable, but which are not found among the fullerenes that are extracted using the method described above. These include, but are not limited to, isolated pentagon isomers of $C_{74}$ ($D_{3h}$) and many larger fullerenes, such as $C_{78}$-$D_{3h}'$ and $C_{80}$-$I_h$.

Fullerenes can also be produced with one or more atoms of another material trapped inside the cage formed by the fullerene molecule. When the trapped atom is a metal, the molecule may be called a metallofullerene or endohedral metallofullerene. While various attempts have been made to produce endohedral metallofullerenes, with one exception, the only endohedral metallofullerenes that have been recovered are those containing metal atoms that have an even total number of valence electrons. For example, endohedral metallofullerenes containing Group II metals (calcium, strontium, and barium) have been isolated. Also, endohedral metallofullerenes containing two Group m metals (scandium, yttrium, and the lanthanides) have been recovered. However, endohedral metallofullerenes containing a metal atom(s) that has an odd number of valence electrons (one or three Group III atoms, e.g.) are, in general, not recoverable. The aforementioned exception occurs when the fullerene cage has 82 carbon atoms. Because they have never been recovered or isolated, the very existence of other endohedral metallofullerenes as stable, recoverable molecules has not been considered certain.

Hence, it is desirable to provide a method for recovering these previously unrecoverable fullerenes and metallofullerenes. It is further desired to provide a fullerene isolation method that is simple and easy to execute, and that does not disrupt or affect the subject fullerenes.

SUMMARY OF THE INVENTION

The present invention provides a method for recovering previously unrecoverable fullerenes. The present method is simple and easy to execute, and does not disrupt or affect the subject fullerenes. According to one embodiment of the present invention, fullerenes in question are reduced through the addition of electrons to a charged state in which they can be dissolved in certain solvents. Once dissolved, the fullerenes can be recovered by removing the charge and returning them to their charge-neutral state.

According to a preferred embodiment, the subject fullerenes are recovered by providing them with an electronic charge sufficient to overcome their tendency to fill their electron-deficient orbitals by forming intermolecular bonds. Once their bonds have broken and they have gone into solution as anions, the subject fullerenes can be recovered by oxidation, i.e. by removing the added charge. The preferred isolation technique includes, but does not require, additional processing steps such as sublimation of the fullerenes to separate them from the bulk of the non-fullerene soot, and the preliminary removal of known fullerenes from the starting material using a known fullerene solvent.

BRIEF DESCRIPTION OF THE DRAWINGS

For a more detailed description of the present invention, reference will now be made to the accompanying Figures, wherein.

DETAILED DESCRIPTION OF THE PREFERRED EMBODIMENTS

Figure 1:
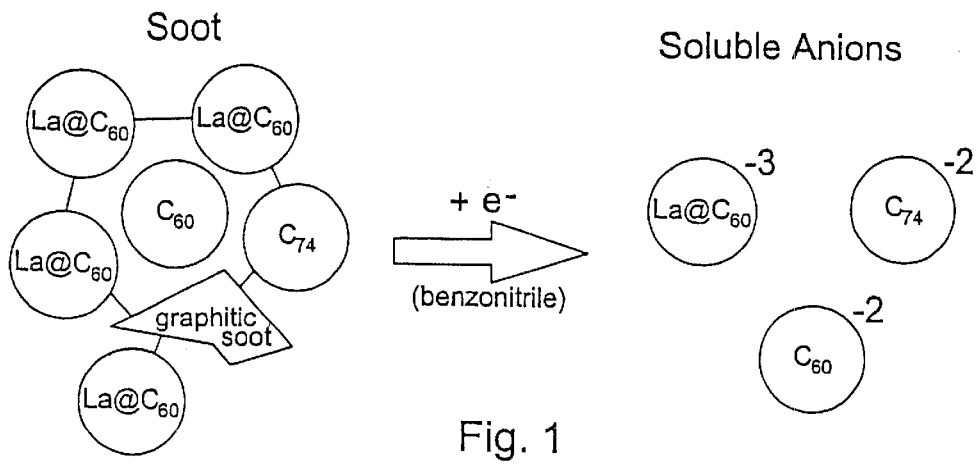
FIG. 1 is an illustration of a hypothetical explanation for the present invention.

It has been discovered that certain types of fullerenes whose existence was heretofore uncertain, do exist and can be dissolved and recovered from the same soot from which the better known fullerenes are presently extracted. More particularly, it has been found that this class of fullerenes has a charge state that is conducive to a much higher degree of intermolecular bonding than previously known fullerenes. It has further been discovered that this bonding can be overcome by providing an additional charge that offsets the inherent electron deficiency of the desired molecules, thereby allowing them to go into solution. In order to facilitate an understanding of the invention, a brief discussion of the electronic structure of fullerenes follows.

Bandgap or HOMO-LUMO Gap

The atomic orbitals, or shells, around each atomic nucleus are the energy states in which electrons associated with that nucleus exist. Each orbital is capable of containing two electrons. The orbitals are filled with the atom's electrons from lowest in energy to highest, until there are no more electrons, leaving some of the orbitals unoccupied. When several atoms bond together to form a molecule, molecular orbitals are formed from the atomic orbitals, and the electrons from all of the atoms in the molecule are distributed in the molecular orbitals. It is known that if the electrons in an occupied orbital of an atom or molecule are sufficiently excited, i.e. provided with enough additional energy, they will jump into an unoccupied orbital. The energy difference between the highest occupied molecular orbital (HOMO) and the lowest unoccupied molecular orbital (LUMO) is referred to as the HOMO-LUMO gap.

In systems containing many atoms, particularly solids but also clusters, the atomic orbitals delocalize throughout the system to form energy "bands" that the electrons in the system can then occupy, filling the bands from lowest energy to highest. The energy difference between the highest occupied band and the lowest unoccupied band is referred to as the bandgap. Sometimes, the solid or cluster does not have enough electrons to completely fill the highest band, resulting in a bandgap of zero. A solid with a bandgap of zero conducts electrons like metals; a finite bandgap results in a semiconductor or insulator, where the electrons must be excited (or removed) in order for the solid to conduct electrical current.

Because fullerenes can be described as either moderately large molecules or medium-sized carbon clusters, either "HOMO-LUIMO gap" or "bandgap" can be used to describe the energy difference between filled and unfilled electronic states. The term "bandgap" is used primarily herein for simplicity. Likewise, as used herein, the phrase "small bandgap fullerenes" is intended to include fullerenes and metallofullerenes having either small or zero bandgaps.

In the case of complex molecules, such as fullerenes, the shape, size and arrangement of the orbitals surrounding the molecule is correspondingly complex and can only be fully analyzed using theoretical predictions and complex calculations. Nevertheless, all empty fullerenes that have been dissolved in conventional fullerene solvents have a bandgap smaller than 0.55 eV. Among endohedral metallofullerenes, only those with an even number of valence electrons on the caged metal atom can be dissolved, as those with an odd number have a bandgap of zero. (There is one exception to this rule: a certain isomer of the $C_{82}$ fullerene cage is thought to have the partially occupied molecular orbital spatially located on the inside of the metallofullerene cage. This prevents the unpaired electron from interacting with other like metallofullerenes, and allows this particular metallofullerene to be isolated. As expected, a solid of these exceptional $C_{32}$ metallofullerenes does not exhibit electron delocalization, is semiconducting, and is, therefore, NOT a small-bandgap fullerene.)

It has been discovered that many of the fullerenes that were previously unrecoverable have very small bandgaps compared to the bandgaps of the known recoverable fullerenes. Unlike the weak van der Waals intermolecular interactions that characterize large bandgap fullerene solids, the small HOMO-LUMO gaps make it energetically favorable for these species to share electrons by bonding together. The resulting bonds may be either metallic or covalent in nature, but are, in any case, much stronger than the van der Waals forces holding the large-bandgap fullerenes together in the condensed phase. Metallic bonding in fullerenes has been previously observed only when the charge of a large bandgap fullerene is reduced, producing an electronic state similar to either a radical or a small bandgap fullerene in a neutral charge state. As a result of the strength of this bonding, the small bandgap fullerenes and metallofullerenes are not solvated by conventional fullerene solvents and therefore they cannot be extracted from the raw fullerene soot or isolated using conventional fullerene purification techniques.

According to the present invention, this intermolecular bonding, which to date has rendered the small bandgap fullerene and most metallofullerene solid material insoluble, is reversed by passivating the individual fullerenes and metallofullerenes to an anionic configuration. The addition of extra electrons to a metallofullerene or small bandgap fullerene fills its low lying or radical electronic orbitals, producing a more stable "closed shell" electronic configuration. This breaks the inter-fullerene bonding in the solid material, and the resulting anions are soluble in organic electrochemical solvents, such as benzonitrile.

A simplified example of how solubilization is hypothesized to occur in the metallofullerene and small bandgap fullerene solid is shown in FIG. 1. Because they are both electron deficient and have low lying or radical ground states, electron sharing readily occurs. Graphite particles, present mainly in the raw soot may also bond to the these fullerenes through the unsatisfied valences that exist along their edges. It is not known whether the conventional empty fullerenes such as the $C_{60}$ shown in FIG. 1 are simply trapped in the matrix, or whether they also participate in the bonded network by accepting electrons from the radical and small bandgap species. Such bonding is at least theoretically possible. In either case, the resulting matrix is insoluble. The addition of charge during the reduction process supplies the electrons needed to give the radical and small bandgap fullerenes a stable closed shell electronic configuration, which breaks the weak bonds of the solid matrix and allows the generated anions to dissolve.

Figure 2:
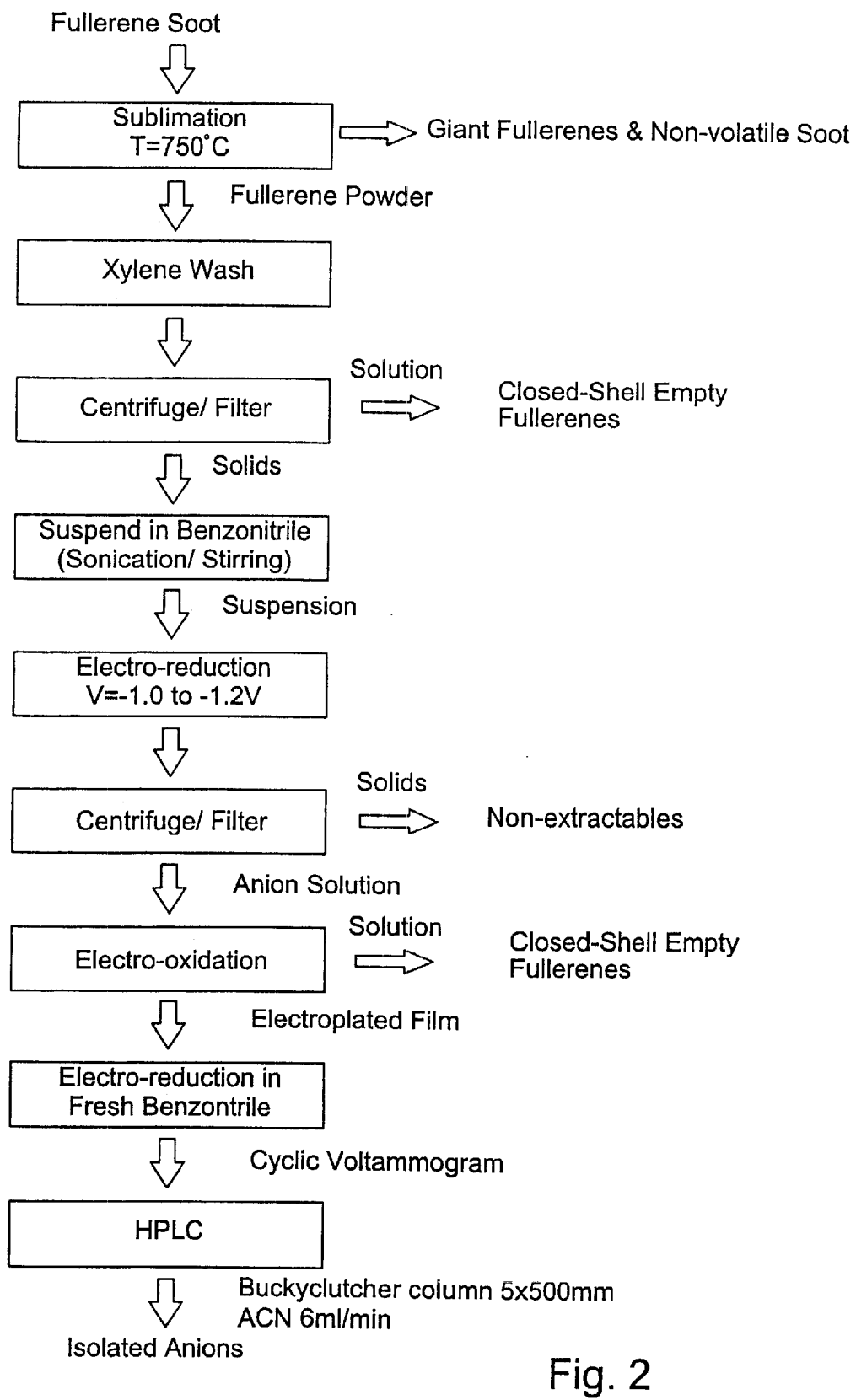
FIG. 2 is a flowchart showing the steps of a preferred embodiment of the present method.

A complete process for purification of both types of small gap fullerenes, based upon closing their electronic shells is shown in FIG. 2 and described in detail below.

Formation of Fullerenes

Referring now to FIG. 2, a preferred embodiment of the multi-step process of the present invention includes preliminary steps 100, 110, 120, 130 that are known in the art. Step 100, the production of fullerenes by arcing graphite rods has been well documented. Any variation of this method, and any future developed fullerene-production technique can be used in conjunction with the present invention to yield small-band gap fullerenes and endo-fullerenes. Fullerenes are formed as the evaporated carbon recondenses at low pressures. Little is known of the exact fullerene formation mechanism, and it is assumed that many unstable species, such as incompletely formed fullerenes, along with graphitic or amorphous carbon fragments and metal carbides exist in the raw soot. Although arc-generated soots were used to show feasibility, the separation process is expected to work equally well on soots produced by other methods, such as combustion or pyrolysis, as well as other compositions containing the subject fullerenes or metallofullerenes.

Both large and small bandgap fullerenes and metallofullerenes were separated from the raw soot in the reactor by a preliminary sublimation step 110. Separating fullerenes from soot by subliming under anaerobic conditions has been previously described in the literature. According to a preferred embodiment of the invention, sublimation is used as a convenient method for preconcentrating the starting material and for facilitating its transfer from the fullerene reactor to an anaerobic atmosphere dry box. The sublimed mixture contains both soluble large bandgap fullerenes as well as small bandgap fullerenes, metallofullerenes (if metal-doped graphite rods were arced), and small amounts of graphitic impurities. This material served as the starting mixture for all subsequent experiments.

Removal of Soluble Fullerenes

After transfer of the sublimed material into the drybox, the fullerene mixture is preferably washed with a non-polar solvent such as xylene in step 120, so as to remove the majority of soluble fullerenes. As is known in the art, the soluble fullerenes, comprising the large bandgap molecules listed above, go into solution. Hence, the insoluble, small bandgap fullerenes can be recovered by centrifuging and filtration step 130, or similar solids-separation steps.

Steps 110, 120 and/or 130, while presently preferred, can be omitted from the present invention without affecting operation of the invention. In instances where they are omitted, the soot from step 100 (or other fullerene-containing substance) is used as the solid feed for step 140.

Solubilization of Small Bandgap and Metallofullerenes by Electroreduction

The solids remaining after filtration of the xylene-washed material include the small-bandgap fullerenes that are the object of the present invention. If the particle size of these solids or of the solid feed) is too great, it may be desired to pulverize or otherwise reduce the particle Size, so as to maximize solution of the subject fullerenes. It has been discovered that the small band-gap fullerenes can be solublized by altering their charge state. To electrochemically reduce the insoluble fullerenes and render them soluble, the solids left after step 130 are first ultrasonically dispersed in a benzonitrile solution containing 0.1 M tetrabutylammonium hexafluorophosphate ($TBA^+PF_6^-$) in step 140. $TBAPF_6$ is a common electrolyte for electrochemical experiments because of its high solubility in polar organic solvents and the stability of its ions with respect to oxidation and reduction. Benzonitrile is preferred because it can simultaneously solubilize both conventional empty fullerenes and fullerene anions. Benzonitrile is a relatively unique solvent, in that it is both polar and polarizable. Polarity is often helpful to dissolve anions and necessary to dissolve the amounts of electrolyte required to conduct the current in the electrochemical cell during bulk electrochemical processes. Polarizability is required to solvate typical soluble fullerenes, which is particularly important where steps 110–130 are omitted. Nevertheless, the choice of solvent is not limited to benzonitrile, and includes 1-methyl-2-pyrrolidinone and any other solvent or solvent mixture capable of solubilizing the supporting electrolyte and fullerene anions can be used. Similarly, other electrolytes, such as $KPF_6$, $TMAPF_6$ or $TBABF_4$, etc. work equally well.

In step 150, the suspension of insoluble fullerenes is vigorously stirred while the working electrode is held at −1 V vs. $Ag/AgNO_3$. This potential is just negative of the voltage required to reduce $C_{60}$ to $C_{60}^{-1}$. The decay of the rate of charge transfer to the solution is monitored. One theory for the solubilization mechanism is discussed above with respect to FIG. 1. The addition of charge during the reduction process supplies the electrons needed to give the radical and small bandgap fullerenes a stable closed shell electronic configuration. This breaks the strong bonds of the small bandgap fullerene solid matrix and allows the generated anions to dissolve in the benzonitrile.

Once reduced, the solution is preferably filtered in step 160 to remove any remaining non-extractables.

Plating-out the small bandgap and metallofullerenes

Figure 7:
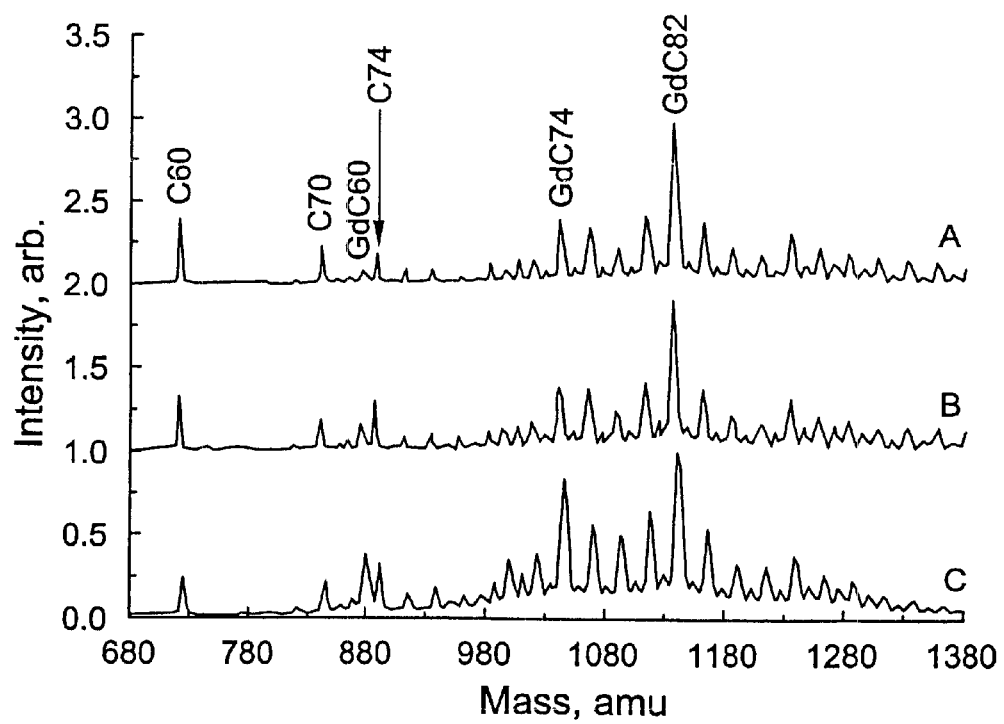
FIG. 7 is a series of exemplary mass spectra of a filtered solution of reduced Gd-fullerenes according to the present invention wherein Spectrum A is after one day of reduction at −1 V, Spectrum B is after two days of reduction at −1 V, and Spectrum C is after two days of reduction at −1 V.

Oxidation of the anion solution at positive potentials in step 170 leaves the soluble fullerenes in solution (as neutrals), but causes the small bandgap group to plate out on the working electrode. Mass spectra of the electrode after oxidation of solutions both with and without Gd-fullerenes are shown in FIG. 7. The improvement in the ratio of small bandgap (and radical) fullerenes to traditional soluble fullerenes versus the washed solid starting material is clear. The material on the working electrode is a completely new kind of fullerene solid, consisting solely of isomers that do not exist in solvent-extracted fullerene solids. In addition the present invention yields solids that are uncontaminated with wide gap fullerenes.

Chemical oxidation and reduction

Because electrons can be supplied equally well by chemical reagents as by electrical current, chemical (as opposed to electrochemical) methods for processing are an alternative embodiment of the present invention. Within minutes of addition of a chemical reductant to a stirred solution containing dispersed insoluble material, all fullerenes capable of being reduced at that potential become soluble. From an electrochemically reduced solution, precipitate of the insoluble neutrals also occurred within seconds after addition of a chemical oxidant. As opposed to the mass transfer limitations of particles hitting an electrode, diffusion of the chemical reactant occurs quite rapidly and is therefore preferred for many applicatons. Furthermore, no apparatus more complicated than a flask and a stirbar are required, in contrast to the careful design required of electrochemical cells; an important economical consideration when scaling to large capacities.

In order to chemically solubilize the insoluble fullerenes, an anion or neutral molecule that will become oxidized when contacting a fullerene is selected. For example, using the donor trimethylhydroquinone ($Me_3QH_2$), the dianion is created by additional of a strong base, tetrabutylammonium hydroxide (TBAOH) according to equation (1):

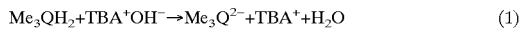
$$Me_3QH_2+TBA^+OH^- \rightarrow Me_3Q^{2-}+TBA^++H_2O \quad (1)$$

Because the reaction $Me_3Q^{2-} \rightarrow Me_3Q+2e^-$ occurs at a potential more negative (−1.16 V vs. SCE in ACN) than that which reduces most fullerenes (for example, $C_{60}+2e^- \rightarrow C_{60}^{2-}$ at −0.8 V), addition of the quinone solution to the insoluble fullerene suspension rapidly results in the transfer of electrons to any fullerene with reduction potentials less negative than −1.16 V. The chemical reduction process quickly solublizes all fullerenes, including the previously unextractable small bandgap fullerenes. It will be understood that any chemical reducing agent supplying the correct reduction potential may used in this process, such as mercury amalgams, alkali metals, and other organic molecular anions with sufficiently negative oxidation potentials. Some of these reducing agents may be capable of providing a charge to the fullerenes via direct contact, even in the absence of a liquid medium.

Chemical oxidation for the selective retrieval of the open shell fullerenes by precipitating them back out of solution is also effective. Suitable oxidants for use in the present process include, but are not limited to ferrocenium salts.

Chemical processing of open shell fullerenes has several advantages over its electrochemical counterpart, in that it is very fast and does not require a complicated cell to be built. Its success hinges on the identification of molecules for electron transfer which are unreactive towards fullerenes (or react in a controlled manner) and can be easily removed afterwards. Since it can be performed in a large vat of solvent, it can be easily adjusted to any scale of production. These characteristics make it sufficiently attractive to pursue as an alternative to the electrochemical method.

Fullerene Anion Chromatography

The electrochemical and chemical methods described above allow for the complete removal of the soluble fullerene isomers, leaving behind a mixture of insoluble empty higher fullerenes, metallofullerenes, and their isomers. In the early years of soluble fullerene research, before separation of the cages into individual sizes (or isomers), the properties of soluble. fullerene mixtures were investigated without much concern to their exact composition. As isolated fullerene cage sizes became available, the unique properties of each cage size were elucidated. Thus, it is desirable to isolate specific members of the new class of fullerenes.

As the new fullerenes are essentially the same size as their "soluble" counterparts, and the extra electrons added during reduction add to the electron surface of the molecules, it is possible, with suitable modifications, to isolate individual small bandgap and metallofullerenes using high performance liquid chromatography (HPLC), anion exchange chromatography, and electrophoresis. According to the present invention, HPLC is used to separate individual small bandgap and metallofullerenes. In this case, chromatography is performed on the reduced anionic species or on a chemically stabilized species rather than the neutral molecule.

Chemical Stabilization of the Small Bandgap and Metallofullerenes

Electrical and chemical reduction of the small bandgap and metallofullerenes are both methods of producing a stable closed shell electronic arrangement that solubilizes the previously insoluble small bandgap fullerenes and radical metallofullerenes. Another technique to solubilize these species is by chemical reactions that produce a stable closed shell product. The present invention extends this principle to synthesize water-soluble derivatives of radical metallofullerenes and small bandgap empty fullerenes. Wide-gap fullerenes have long been known to undergo facile addition of amines. For example, when the insoluble residue after xylene washing (step 120) was stirred in serinol for a few hours, all fullerenes and metallofullerenes could be extracted into water. Filtration though a 0.45 $\mu$m teflon filter or centrifugation left considerable residue from insufficiently reacted fullerenes, but also passed a yellow-colored solution. Analysis of the solution via LD-TOF-MS revealed the presence of all fullerenes and metallofullerenes, but did not show the serinol groups on the fullerenes. This is expected due to the harsh laser ionization process, which commonly fragmets organic non-fullerene molecules, although fragmentation of fullerenes is relatively difficult Serinol is but one example of a chemical agent that has both a part that can add to the fullerene cage and another part that is readily solvated by the solvent of interest; for example, serinol has an amine that readily adds to the fullerene and hydroxyl groups which are readily solvated by water or alcohols. Once derivatized to a specific product, additional separation can be carried out with conventional HPLC methods. With chemically derivatized stabilization, the development of applications requiring the small bandgap and metallofullerenes should be greatly facilitated.

The following Example is intended to illustrate the particulars of a proven technique in accordance with the present invention, and is not intended to limit the scope of the claims.

EXAMPLE

All steps—All process steps were performed anaerobically under helium and at no time was the soot exposed to atmospheric oxygen or moisture.

Step 100—The fullerene and metallofullerene soots utilized in our process were generated in a carbon arc using 150 amps of current to vaporize graphite in a 150 torr He atmosphere.

Step 110—Sublimation was carried out at 750° C. and 0.01 torr.

Figure 3:
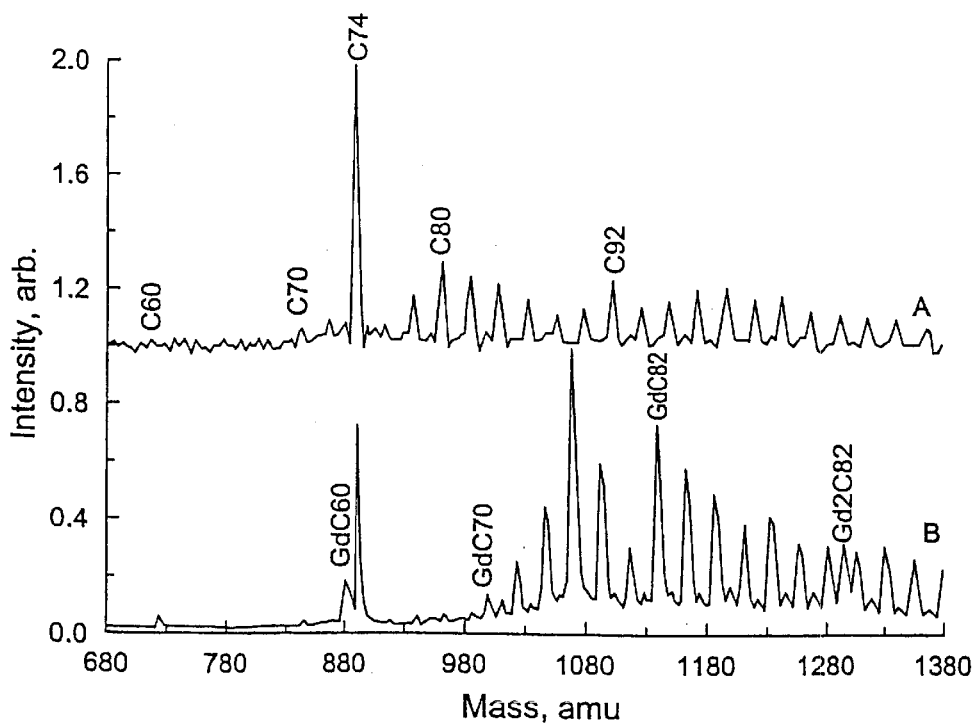
FIG. 3 is a series of exemplary mass spectra of the surface film on the electrode after oxidation of a solution of anions created according to the present invention, wherein Spectrum A is a film of empty fullerenes and Spectrum B is a film containing Gd-fullerenes.

Step 120—FIG. 2 presents laser-desorption time-of-flight mass spectra (LD-TOF-MS) that show its effect on the composition of a gadolinium metallofullerene sample. Frame A shows the sublimed starting material. Frame B shows the o-xylene solution, containing only $Gd@C_{32}$ amongst metallofullerenes. Frame C shows that the rest of the metallofullerenes ($Gd@C_n$, n=60, 70+2x, x=0,1,2, 3, . . . ) as well as the small bandgap empty fullerene $C_{74}$, remain in the insoluble portion. Approximately 80% of the large bandgap fullerenes, such as $C_{60}$-$I_h$ and $C_{70}$-$D_{5h}$, are removed by washing. FIG. 3 shows the same washing procedure applied to empty fullerenes.

Step 150—The cell for the processing was designed for proof-of-concept scale bulk electrolysis. It holds 20—40 ml, which restricts the amount of insolubles that can be processed at one time. A solubility of one mg/ml for insoluble ions was assumed in order to set a limit on the amount of solids for one run. The working and counter electrodes were both platinum disks, with a surface area of about 0.25 cm$^2$ per disk. Larger electrodes would speed the process, but the working electrode was limited to this size so that it could double as a mass spectrometry target. This was done to ease analysis of films formed on the electrode. The counter electrode was separated from the main cell by a ten millimeter diameter glass frit with pores of <10 micron diameter. The reference electrode was Ag/Ag+ formed from a silver wire in a solution of acetonitrile that was 0.1 M TBAPF$_6$ and 0.01 M AgNO$_3$. It was separated from the main cell by a five millimeter diameter vycor frit. In this system, the ferrocenium/ferrocene couple used as an internal standard occurs at +0.1 V. A computer—controlled EG&G Versastat was employed as the potentiostat for the experiments. No special requirements are needed of the electrochemical cell, and any electrochemical cell suitable for bulk reduction in organic media could be utilized.

Figure 4:
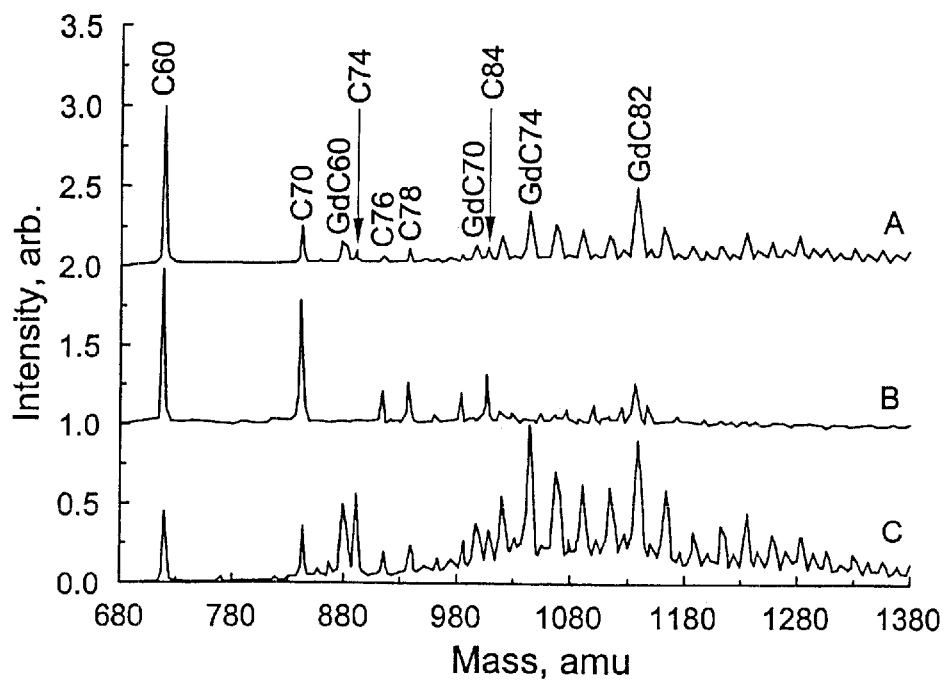
FIG. 4 is a series of exemplary mass spectra relating to washing of a Gd-fullerene starting material according to the present invention wherein Spectrum A is the sublimed film, Spectrum B is the fraction dissolved in o-xylene, and Spectrum C is the solids after washing in o-xylene.
Figure 5:
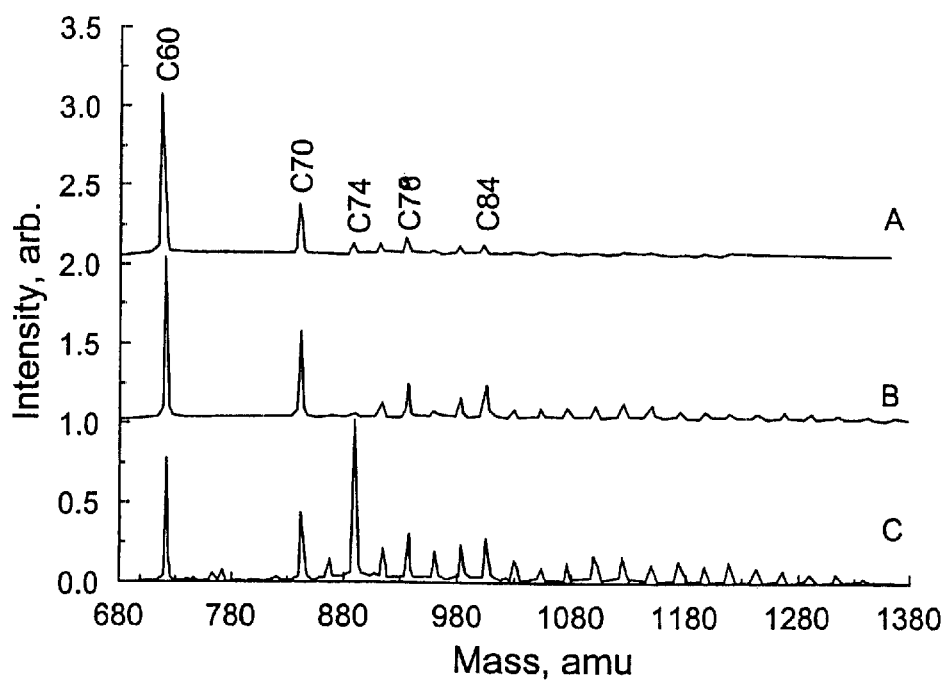
FIG. 5 is a series of exemplary mass spectra relating to washing of a fullerene starting material according to the present invention wherein Spectrum A is the sublimed film, Spectrum B is the fraction dissolved in o-xylene, and Spectrum C is the solids after washing in o-xylene.
Figure 6:
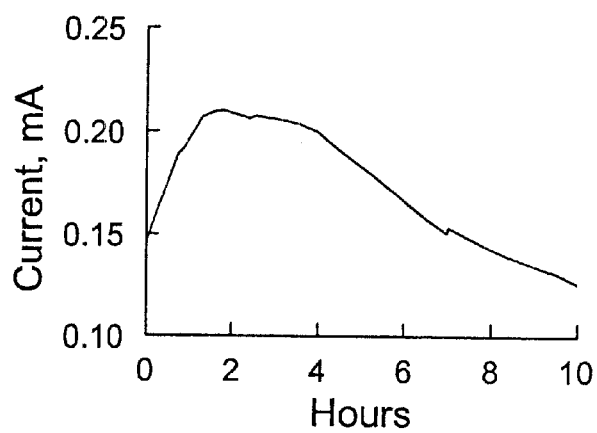
FIG. 6 is an exemplary current vs. time curve for electro-reduction of washed solids dispersed in benzonitrile with an electrolyte ($TBAPF_6$)

For electro reduction, a typical current versus time curve at a constant potential is shown in FIG. 4. The unusual increase at the beginning is related to the breakup of particles into smaller pieces as they receive charge and the ability of dissolved fullerenes such as $C_{60}$ to act as charge carriers once freed from the particles (i.e. a $C_{60}$ in solution can be reduced to $C_{60}^{-2}$ which subsequently transfers its charge to a species in the particles with a higher electron affinity). This is tantamount to an increase in surface area of the solid, which causes an increase in the rate of reduction. Once the particles have been broken down, the transfer proceeds with the exponential decay typical of controlled potential coulometry.

Step 160—The solution is preferably filtered through a 0.45 micron pore nylon filter, and typically will leave almost nothing on the filter paper. It is estimated that greater than 98% of the originally insoluble material is in solution after step 150. Mass spectra of a filtered solution of Gd-metallofullerenes (and small bandgap empty fullerenes) are displayed in FIG. 7, and they clearly demonstrate that the formerly insoluble fullerenes are now in solution.

Of course, traditionally soluble fullerenes that were trapped in the original particle matrix, now also anions, are in solution too. Since these are positive ion mass spectra of negative ions, the relative intensities of fullerenes that have acquired more electrons are depressed. By comparing the change in relative intensities, the relative charge states of the fullerenes can be qualitatively determined. For example, $Gd@C_{82}$ shrinks dramatically relative to other Gd-fullerenes, suggesting that a fair portion of it is not as reduced. Likewise, $Gd@C_{60}$ greatly increases in intensity relative to $C_{70}$, showing that it is more highly reduced.

Figure 8:
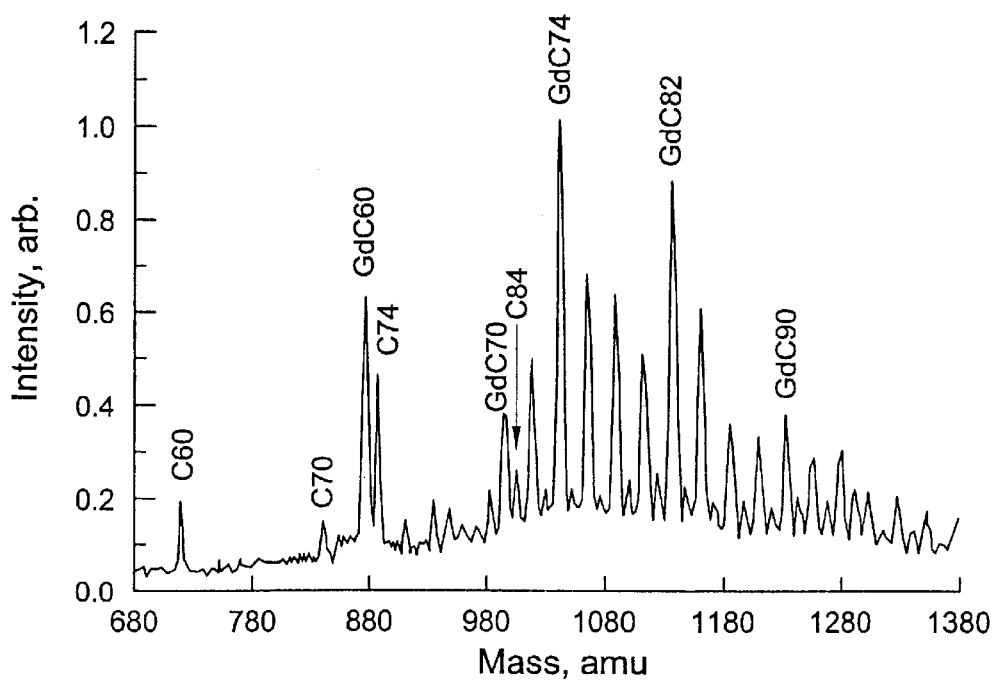
FIG. 8 is an exemplary mass spectrum of the precipatate from a solution of Gd-fullerenes after addition of ($Fe(C_5H_5)_2$) $PF_3$ according to the present invention.

Step 170—Following reduction as discussed above, chemical oxidation began with the addition of ferrocinium hexafluorophosphate powder to the electrochemically generated anion solution, and reduced the ferrocinium cation to ferrocene (at +0.1 V) as the fullerenes were oxidized back to a neutral state. A mass spectrum of the chemically precipitated fullerenes is shown in FIG. 8.

Step 190—So far, the small bandgap fullerenes have been isolated from the large bandgap fullerenes. In order to separate the small bandgap fullerenes from each other, they are re-reduced into solution in preparation for chromatographic or electrophoretic separation.

Figure 9:
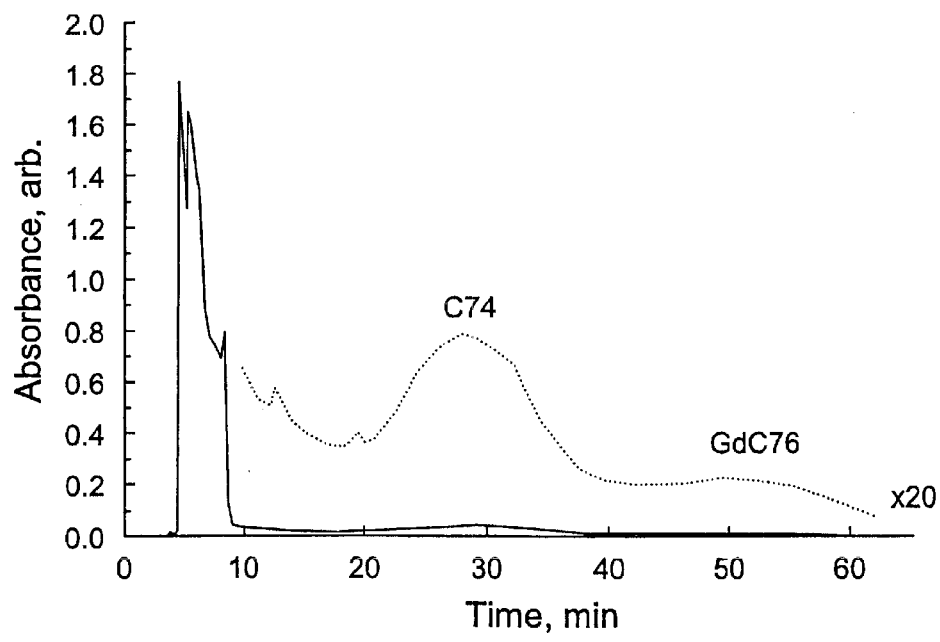
FIG. 9 is an exemplary chromatogram of anions eluting from an HPLC column according to the present invention.

Step 200—Trial experiments used the BuckyClutcher™ HPLC column (10 mm diameter by 50 cm length) available from Regis Technologies Inc. of _Morton Grove, Ill——. As the anions are not expected to be very soluble in xylene or the other nonpolar traditional fullerene solvents used with this column, a mobile phase that had never previously been tried on the column was required. When benzonitrile (BzCN) was removed from the purified fullerenes by rotary evaporation, and the solids were dissolved in acetonitrile (ACN) by sonication followed by centrifugation, a small percentage of each kind of anion was observed to redissolve. This limited solubility made ACN an attractive mobile phase for the HPLC experiments. Neutral empty fullerenes that are soluble in toluene have no measurable solubility in ACN, and would not be expected to make it through the column. An injection of mixed anions in BzCN was made into the BuckyClutcher column with pure ACN as the eluent. FIG. 9 displays the chromatogram, observed at 305 nm with an ACN flow through the column of 6 ml/min. Several fractions were collected, and TOF-MS analysis was performed.

Figure 10:
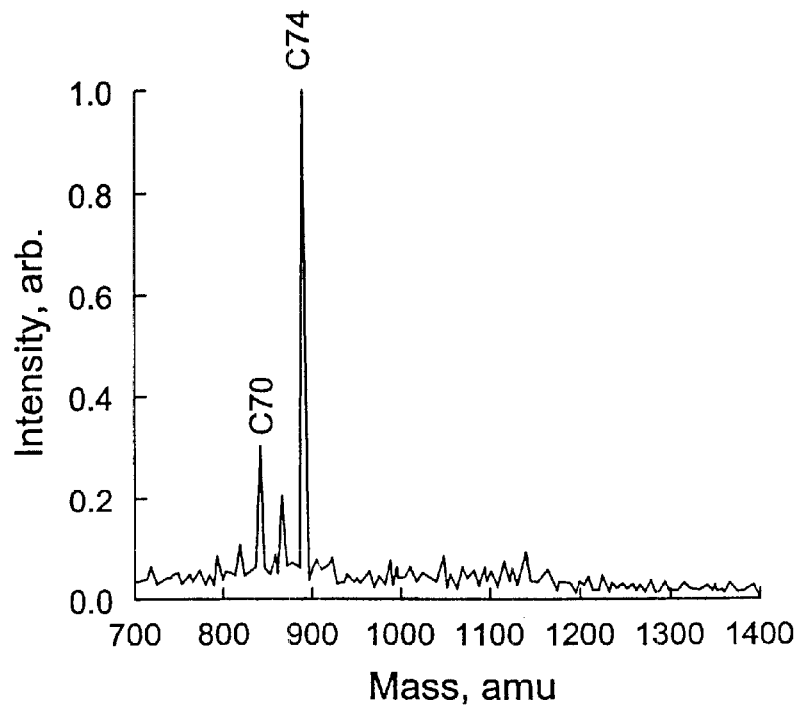
FIGS. 10 and 11 are mass spectra for a final product produced according to a preferred embodiment of the present invention.
Figure 11:
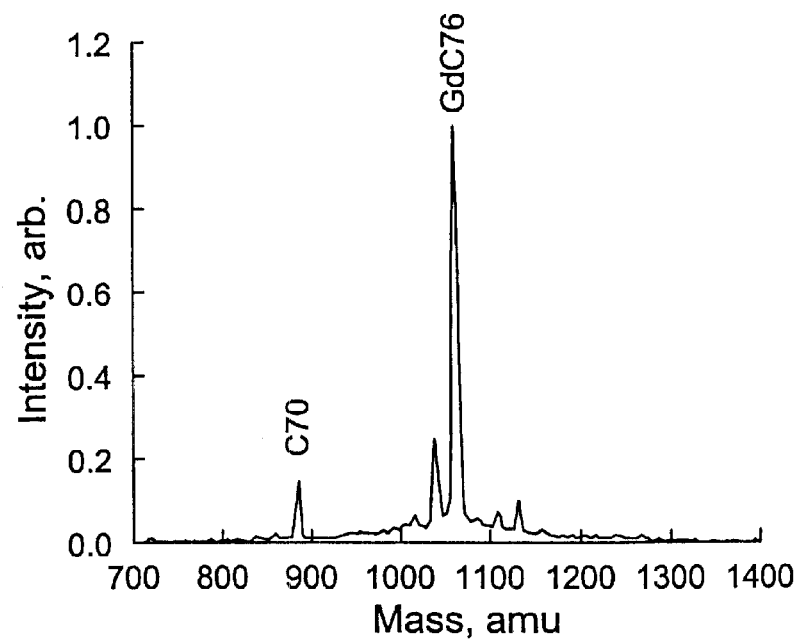

The mass spectra of the last two peaks are displayed in FIGS. 10 and 11, in order of elution. The presence of $C_{70}$ and $C_{72}$ in the mostly $C_{74}$ peak is due to fragmentation of the $C_{74}^{n-}$ cluster; they are mass spectral artifacts. The $M@C_{76}$ anion may be especially stable and soluble in ACN based on FIG. 10. The second peak to elute was identified as $Gd@C_{76}$, again a species that has never before been isolated. Other metallofullerenes, including $Gd@C_{74}$, $Gd@C_{78}$, $Gd@C_{80}$, etc., eluted at later times with less resolution.

These results demonstrate the feasibility of separating anions using liquid chromatography. With the identification of a suitable stationary/mobile phase combination, it should be possible to isolate all of the individual small bandgap and metallofullerene species. After separation, each of the individual species can be oxidized to form pure films of the neutral molecule.

It will be understood that the presence of certain substances, including oxygen and some metals, will have a detrimental effect on the recovery of small bandgap fullerenes. For this reason, it is preferred to maintain the material being processed in an uncontaminated environment until the desired small bandgap product has been produced.

Discussion

Three preferred methods for adding the electrons to a small bandgap fullerene and thereby allowing it to be solublized and recovered are disclosed above. The chemically simplest method is electrochemical solubilization, colliding small bandgap fullerene solid particles with a solid, negatively charged electrode. Another technique is chemical solubilization, wherein the small bandgap fullerenes acquire (or release) the electrons from collisions as a result of other chemical species in solution, which remain independent from the fullerene. Finally, in chemical derivatization the electrons may be acquired via reaction with other chemicals in solution, which remain attached to the fullerene.

Expected Utility

Since the discovery of a method for producing bulk quantities of fullerenes in 1990, and extracting the large bandgap fullerenes from the soot, fullerenes have attracted worldwide interest, with thousands of research publications appearing annually. These research demands are currently supported by an industry dedicated to the production and separation of fullerenes. The previously isolated, large bandgap fullerenes are all excellent electrophiles in chemical reactions, but are nucleophiles to only the strongest acids. Their electrochemical behavior corroborates the view of them as electron sponges. In the solid phase, their wide bandgaps result in semiconducting properties. The applications of these types of fullerenes have been limited by these characteristics.

In contrast, the metallofullerenes and small bandgap fullerenes recovered according to the present invention have either a radical ground state or at most, a small gap between the filled and unfilled electronic states. In the solid state this results in partially filled bands, which normally causes metallic properties to arise. These are different from the properties of the soluble fullerenes, which are semiconductors.

The electronic properties of the small bandgap and metallofullerenes should make them very useful electronic and optical materials. Depending on the exact electronic arrangement, these materials may be molecular conductors and possibly superconductors. They may be ideal for producing the n-type materials needed to fabricate all fullerene transistors, diodes, and other semiconducting devices such as solar cells. Their electrochemical properties also suggests applications in batteries. Previous work has already shown that empty fullerenes have third order nonlinear optical properties, and the unpaired electrons will substantially improve them. The same arguments apply to second-harmonic generation from fullerene-derivative films. Again depending on the exact electronic structure, it may be possible to construct new types of magnetic, ferromagnetic, or ferroelectric materials from both the small bandgap and metallofullerenes.

In addition, the cage structure of metallofullerenes gives them the ability to safely (robustly) encapsulate metal atoms in an environment that renders the metal atom(s) immune from chemical attack. This property makes them ideal candidates for use in biomedical applications such as medical imaging. Experiments have already demonstrated the ability of metallofullerenes to safely carry nuclear activated metal atoms into the body.

What is claimed is:

1. A product produced by the method comprising:
   providing amount of fullerenes containing a first ratio of small bandgap fullerenes to total fullerenes;
   reducing small bandgap fullerenes until they can be solvated; and
   forming the product from the solvated small bandgap fullerenes, the product comprising a second ratio of small bandgap fullerenes to total fullerenes;
   wherein the second ratio of small bandgap fullerenes to total fullerenes is greater than the first ratio of small bandgap fullerenes to total fullerenes.

2. The product according to claim 1 wherein the method includes the step of removing large bandgap fullerenes from the mixture.

3. The product according to claim 1 wherein the method includes the step of removing soot from the mixture.

4. The product according to claim 1 wherein the reduction is carried out using an electrode in an electrolyte solution.

5. The product according to claim 1 wherein the reduction is carried out using a chemical reductant.

6. The product according to claim 1 wherein the reduction is carried out using a reductant selected from the group consisting of: trimethylhydroquinone, mercury amalgams, alkali metals, and organic molecular anions oxidation potentials less than −0.8 V.

7. The product according to claim 1 wherein the method includes the step of oxidizing the small bandgap fullerenes.

8. The product according to claim 7 wherein the oxidation is carried out using an electrode in an electrolyte solution.

9. The product according to claim 7 wherein the oxidation is carried out using a chemical oxidant.

10. The product according to claim 7 wherein the oxidation is carried out using ferrocenium hexafluorophosphate.

11. The product according to claim 1 wherein the method includes purification of small bandgap fullerenes of a single elemental composition.

12. The product according to claim 11, wherein the purification is carried out by liquid chromatography.

13. The product according to claim 11, wherein the purification is carried out on an anion-exchange column.

14. The product according to claim 11, wherein the purification is carried out in an electrophoresis cell.

15. The product according to claim 1 wherein the method includes purification of isomerically pure small bandgap fullerenes.

16. The product according to claim 15, wherein the purification is carried out by liquid chromatography.

17. The product according to claim 15, wherein the purification is carried out on an anion-exchange column.

18. The product according to claim 15, wherein the purification is carried out in an electrophoresis cell.

19. A product produced by the method comprising:
   providing amount of fullerenes containing a first ratio of small bandgap fullerenes to total fullerenes;
   reducing small bandgap fullerenes by chemical reaction with an electron-donating molecule until they can be solvated; and
   forming the product from the solvated small bandgap fullerenes, the product comprising a second ratio of small bandgap fullerenes to total fullerenes;
   wherein the second ratio of small bandgap fullerenes to total fullerenes is greater than the first ratio of small bandgap fullerenes to total fullerenes.

20. The product according to claim 19 wherein the method includes the step of isolating a small bandgap fullerene of specific elemental composition by liquid chromatography.

21. The product according to claim 19 wherein the method includes the step of isolating an isomerically pure small bandgap fullerene by liquid chromatography.

22. A composition comprising at least 40% by weight fullerenes that are not soluble in xylene.

23. The composition according to claim 22, comprising at least 80% by weight fullerenes that are not soluble in xylene.

24. The composition according to claim 22, comprising at least 80% by weight fullerenes having HOMO-LUMO gaps less than 0.55 eV.

* * * * *